July 4, 1961
F. BUTTERFIELD
2,990,890
IN ROW CULTIVATOR
Filed July 17, 1959
2 Sheets-Sheet 1
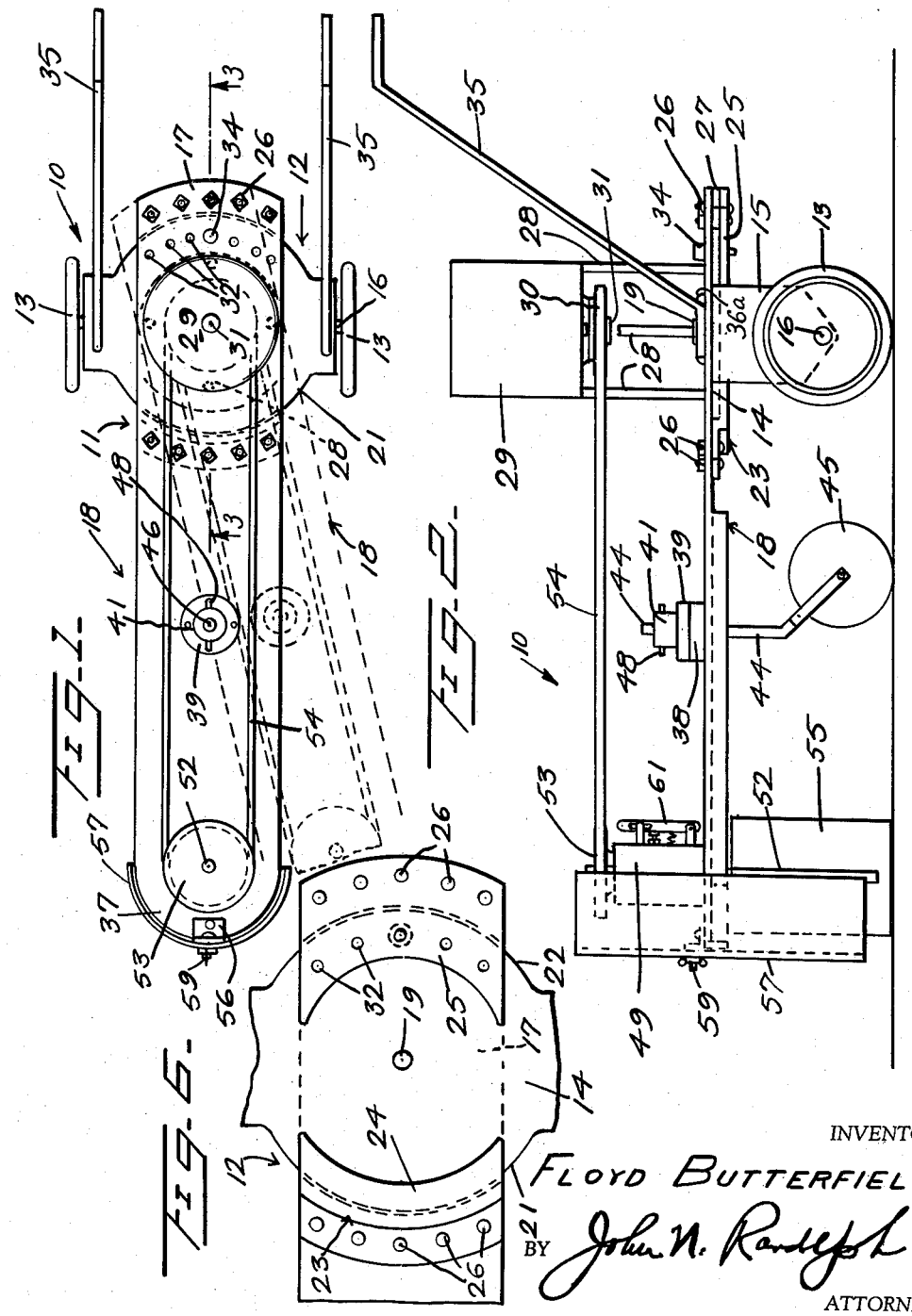
INVENTOR
FLOYD BUTTERFIELD
BY John N. Randolph
ATTORNEY

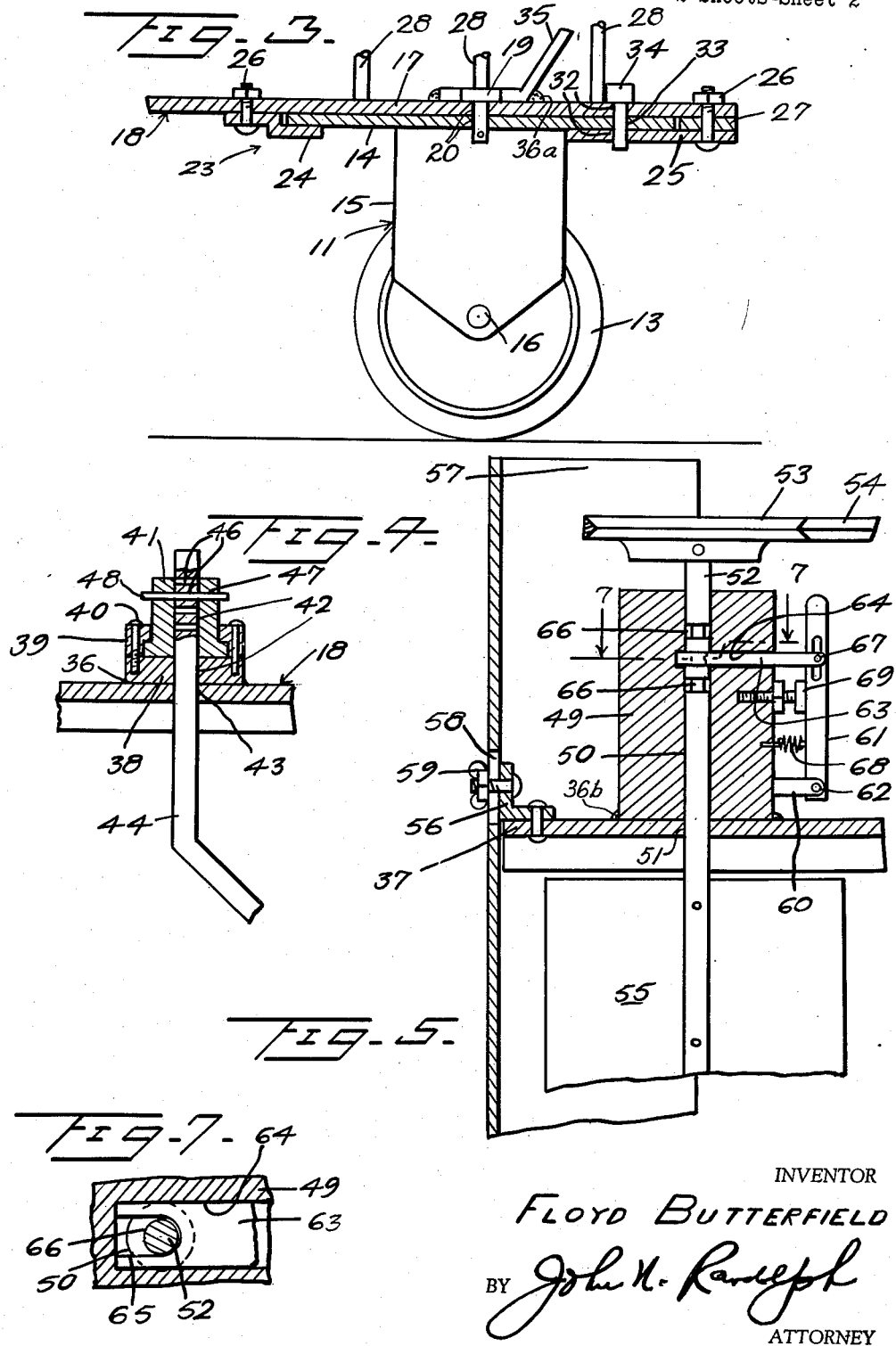

United States Patent Office 2,990,890
Patented July 4, 1961

2,990,890
IN ROW CULTIVATOR
Floyd Butterfield, River Road, Perry, Ohio
Filed July 17, 1959, Ser. No. 827,789
2 Claims. (Cl. 172—43)

This invention relates to a cultivator primarily adapted for cultivating vegetable and flower gardens and having means enabling the cultivating and mulching of the earth to any desired depth and in extremely close proximity to flowers and vegetables.

A primary object of the present invention is to provide a cultivator capable of being propelled between rows of flowers or vegetables and having means whereby a cultivating blade or element thereof may be positioned laterally offset relative to the path of travel of the machine.

A further object of the invention is to provide means for varying the operating depth of the cultivator element and for shielding the cultivator element to prevent contact of said element with plants adjacent to which it is operating.

Various other objects and advantages of the invention will hereinafter become more fully apparent from the following description of the drawings, illustrating a presently preferred embodiment thereof, and wherein:

FIGURE 1 is a top plan view of the cultivator;

FIGURE 2 is a side elevational view thereof;

FIGURE 3 is an enlarged fragmentary longitudinal sectional view through the rear portion of the cultivator, taken substantially along a plane as indicated by the line 3—3 of FIGURE 1;

FIGURE 4 is an enlarged fragmentary vertical sectional view through the intermediate portion of the cultivator and taken longitudinally thereof;

FIGURE 5 is an enlarged fragmentary vertical sectional view taken longitudinally through the forward end of the cultivator;

FIGURE 6 is a fragmentary bottom plan view of the rear end of the cultivator, and FIGURE 7 is a fragmentary horizontal sectional view, on an enlarged scale, taken substantially along a plane as indicated by the line 7—7 of FIGURE 5.

Referring more specifically to the drawings, the cultivator in its entirety is designated generally 10 and includes a truck 11 composed of a truck frame 12 and a pair of transversely aligned ground wheels 13. The truck frame 12 includes a substantially flat top portion 14 and depending sides 15. Stub axles 16 extend outwardly from the sides 15 for journaling the wheels 13.

One end 17 of an elongated beam 18 rests upon the frame top 14. A headed pin 19 engages aligned opening 20 in the frame top 14 and beam end 17, as seen in FIGURE 3, for swivelly connecting said beam end to the truck 11. The frame top 14 has an arcuate front edge 21 and an arcuate back edge 22, which edges are disposed substantially concentric relative to the opening 20 of the frame top.

An arcuately bowed bracket 23 is secured to the underside of the beam end 17 by fastenings 26 and has a downwardly offset arcuate rear edge portion 24 underlying a forward part of the frame top 14 including a part of the forward edge 21 thereof. An arcuate strip or plate 25 has a forward portion disposed beneath the arcuate back edge 22 of the frame top 14 and is supported by additional fastenings 26 which extend through the rear portion of the plate 25 and the distal end of the beam part 17, beyond the edge 22. A spacing strip 27 is interposed between the distal part of the beam end 17 and the rear edge of the plate 25, beyond the frame edge 22, and the fastenings 26 extend through said spacing element 27. The parts 24 and 25 are spaced sufficiently from the beam end 17 to allow the frame top 14 to rotate therein and so that the beam end 17 is swivelly mounted on and connected to the truck portion 14.

Posts or standards 28 are fixed to and rise from the beam end 17 and support a power source 29, such as a gasoline engine or electric motor, in a position preferably centered over the truck 11. A pulley 30 is fixed to the rotary drive shaft 31, which extends downwardly from the power source 29, said shaft and pulley being disposed substantially above the level of the beam 18.

The beam end 17 and plate 25 are provided with a series of spaced aligned openings 32 which are disposed concentrically of the openings 20, and the frame top 14 is provided with an opening 33 which may be selectively aligned with any aligned pair of openings 32 for receiving a headed pin 34 for locking the beam 18 to the frame 12, either in alignment with the truck 11 or at a desired angle relative to the truck, as illustrated in full and dotted lines in FIGURE 1. Other means than the openings and pin may be provided for locking the beam in different angularly adjusted positions relative to the truck.

The frame top 14 is substantially wider than the beam end 17 and a pair of handles 35 have corresponding ends welded or otherwise suitably secured, as seen at 36a, to the frame top 14 and spaced outwardly from the side edges of the beam end 17 sufficiently so that the handles 35 will not interfere with the angular adjustment of the beam 18 relative to the truck 11. The handles 35 extend upwardly and rearwardly from the truck, or in a direction away from the other end 37 of the beam 18.

A bearing block 38 is secured as by welding, as indicated at 36, to the upper side of the beam 18, between and spaced from its ends 17 and 37. An annular cap 39 having a recessed bottom portion is detachably secured on the bearing block 38 by fastenings 40. A retaining block 41 is swivelly mounted on the bearing block 38 with its lower part conformably fitting within the recessed cap 39, as best seen in FIGURE 4, whereby said holding block 41 is swivelly attached to the bearing block 38 and cap 39. The bearing block 38 and the holding block 41 have aligned bores 42 which are disposed in alignment with an opening 43 of the beam 18. An upright post 44 of a caster wheel 45 fits turnably and slidably in the bores 42 and opening 43. Said post 44 is provided with longitudinally spaced diametrically extending bores 46 adapted to be selectively aligned with a diametrical bore 47 of the holding block 41 to receive a pin 48 for adjustably securing the post 44 immovably to the block 41 and with the beam 18 disposed at a desired elevation above the caster wheel 45. Thus, by vertical adjustment of the post 44 relative to the block 41, the elevation of the beam end 37 can be varied.

As best seen in FIGURE 5, a bearing post 49 is welded, or otherwise secured, as seen at 36b, to the beam end 37 and extends upwardly therefrom. The bearing post 49 has a bore 50 extending vertically therethrough and aligning with an opening 51 in the beam end 37. A shaft 52 fits turnably in the opening 51 and is journaled in the bore 50. A pulley 53 is fixed to the shaft 52, above the bearing 49 and an endless belt 54 is trained over the pulleys 30 and 53 for driving the shaft 52 from the drive shaft 31. An earth working blade 55 is fixed to the shaft 52 for rotation therewith, and is disposed below the beam end 37. The earth working blade or implement 55 may be of any suitable construction for cultivating, mulching or otherwise engaging the earth, and any form of earth working blade or implement capable of being operated by a turning movement may be substituted for the blade 55 as shown.

The end 37 of the beam 18 is preferably approximately semicircular and concentrically disposed relative to the shaft 52. An angle bracket 56 is welded or otherwise fixed to and extends upwardly from the forwardmost central portion of the beam end 37. A shield 57, of substantially semicircular cross section, fits around the semicircular beam end 37 and extends upwardly and downwardly therefrom and is provided with a longitudinally elongated slot or opening 58, midway of its side edges to accommodate the shank of a bolt and nut fastening 59 which also extends through the upright part of the bracket 56. The slot 58 enables the shield 57 to be vertically adjusted when the fastening 59 is loosened to vary the elevation of the bottom edge of said shield relative to the bottommost part of the blade 55. As seen in FIGURE 5, the lower portion of the shield 57 is disposed around and spaced outwardly from the forward half of the circle described by the rotation of the blade 55 to provide a shield between said blade and plants adjacent to which said blade is operating. The level of the bottom edge of the shield 57 determines the depth at which the blade can operate and enables said blade to operate in extremely close proximity to growing plants without risk of injury to the plants.

A bracket 60 is fixed to and extends outwardly from a part of the bearing 49. A lever 61 is pivotally connected by a fastening 62, near one end of said lever, to the outer end of the bracket 60. A latch bar 63 is slidably mounted in a transverse or radial bore 64 of the bearing 49, which intersects the bore 50. The inner end of the latch bar 63 is bifurcated to provide a substantially U-shaped notch 65 which engages any one of the longitudinally spaced annular grooves 66 of the shaft 52 for supporting the shaft at different elevations relative to the bearing 49. The other outer end of the latch bar 63 is pivotally and slidably connected to the lever 61, near the free end of said lever, by a pin and slot connection 67. A pull spring 68 is anchored to the bearing 49 and connected to the lever 61 for urging said lever to swing toward the bearing for displacing the latch bar 63 inwardly and into engagement with a selected groove 66. An adjustable stop 69 which is threadedly mounted in and projects outwardly from the bearing 49 is engaged by the lever 61 to limit inward swinging movement of said lever and inward sliding movement of the latch bar 63 to prevent a binding engagement of the latch bar with the shaft 52.

As previously described and as illustrated in dotted lines in FIGURE 1, the beam may be angularly adjusted to offset the beam end 37 and the earth working blade 55 in either direction relative to the axis of the truck 11 and to a desired extent so that the path of travel of the blade 55, as the cultivator 10 is propelled forwardly or from right to left of FIGURE 1, in a straight line, will be laterally outward of the wheel 13, in front of which the blade 55 is most nearly disposed. Consequently, the truck 11 can be propelled in a straight course between plant rows and while the blade 55 is positioned to operate in close proximity to the plants of one of said rows. Obviously, the beam 18 can be angularly adjusted so that its end 37 will be laterally offset either to the right or to the left of the truck 11 as desired.

Various modifications and changes are contemplated and may be resorted to, without departing from the function or scope of the invention as hereinafter defined by the appended claims.

I claim as my invention:

1. A cultivator comprising a truck having a forward end and a rear end, said truck including a frame having a substantially horizontal top portion, a single pair of laterally spaced wheels supporting said frame, means rigidly connected to the frame and extending beyond said rear end for propelling and steering the cultivator; an elongated substantially horizontal beam having a rear end resting on and supported by said top portion and a forward end disposed remote from the truck, means connecting the rear end of the beam to said top portion for swivel movement of the beam relative to the truck about a vertical axis for laterally offsetting the forward beam end relative to the truck, means locking the beam to the truck in different angularly adjusted positions of the beam, a power source connected to and supported above said rear beam end and having a vertical drive shaft, a shaft extending vertically through the forward end of the beam, means adjustably supporting and journaling said shaft on the forward beam end, an earthworking tool fixed to and supported by the shaft beneath the beam, a caster wheel disposed beneath and supporting the beam between and spaced from the truck and tool, means connecting the caster wheel in different vertically adjusted positions to the beam for varying the elevation of the forward beam end and tool, and flexible means encircling both shafts and forming a driving connection therebetween.

2. A cultivator as in claim 1, and a shield of semicylindrical cross section secured in an upright position to the forward beam end and disposed substantially concentric to the tool supporting shaft, said shield having a lower portion extending downwardly from the beam and partially surrounding said tool.

References Cited in the file of this patent

UNITED STATES PATENTS

| | | |
|---|---|---|
| 1,511,242 | Stewart | Oct. 14, 1924 |
| 1,533,701 | Evanuk | Apr. 14, 1925 |
| 1,691,352 | Hicks | Nov. 13, 1928 |
| 2,410,273 | Deubner | Oct. 29, 1946 |
| 2,455,369 | Kuykendall | Dec. 7, 1948 |
| 2,558,822 | Claus | July 3, 1951 |
| 2,614,473 | Yacoby | Oct. 21, 1952 |
| 2,684,495 | Litkenhous | July 27, 1954 |
| 2,792,769 | Harshberger | May 21, 1957 |
| 2,805,612 | Beard | Sept. 10, 1957 |
| 2,913,058 | Smith et al. | Nov. 17, 1959 |

FOREIGN PATENTS

| | | |
|---|---|---|
| 649,999 | France | Sept. 11, 1928 |
| 2,904 | Great Britain | Nov. 3, 1870 |
| 369,423 | Great Britain | Mar. 24, 1932 |